United States Patent [19]
Theising et al.

[11] Patent Number: 6,076,443
[45] Date of Patent: *Jun. 20, 2000

[54] BELLOWS WITH FLEXIBLE STEM FOR SAW

[75] Inventors: John L. Theising, St. Peters; Roy J. Benoist, Jenning's, both of Mo.

[73] Assignee: Emerson Electric Co., St. Louis, Mo.

[*] Notice: This patent issued on a continued prosecution application filed under 37 CFR 1.53(d), and is subject to the twenty year patent term provisions of 35 U.S.C. 154(a)(2).

[21] Appl. No.: 08/805,274

[22] Filed: Feb. 25, 1997

[51] Int. Cl.[7] .......................................... B26D 7/18
[52] U.S. Cl. ................. 83/98; 83/168; D23/384
[58] Field of Search ................. 83/98, 99, 168; 15/312.2, 314; D23/384; 417/472, 473

[56] References Cited

U.S. PATENT DOCUMENTS

| | | | |
|---|---|---|---|
| 126,740 | 5/1872 | Powers | 83/98 |
| 2,395,237 | 2/1946 | Swenson | 83/168 X |
| 3,640,635 | 2/1972 | Van Hollen | 408/101 |
| 4,009,812 | 3/1977 | Keuchel et al. | 83/168 X |
| 4,094,102 | 6/1978 | Lauze et al. | 51/33 R |
| 4,616,541 | 10/1986 | Eccardt et al. | 83/98 |
| 4,637,443 | 1/1987 | Jansson | 144/39 |
| 4,655,690 | 4/1987 | Boedecker et al. | |
| 5,016,512 | 5/1991 | Huang | 83/783 |
| 5,065,652 | 11/1991 | Legler et al. | 83/168 |
| 5,185,956 | 2/1993 | Steere, Jr. | 51/5 |
| 5,189,843 | 3/1993 | Steere, Jr. | 51/165.76 |
| 5,220,857 | 6/1993 | Freeburger | 83/468.3 |
| 5,301,579 | 4/1994 | Shiotani et al. | 83/98 |
| 5,357,834 | 10/1994 | Ito et al. | 83/471.3 |
| 5,390,577 | 2/1995 | Huang | 83/784 |
| 5,392,678 | 2/1995 | Sasaki et al. | 83/471.3 |
| 5,437,214 | 8/1995 | Sasaki et al. | 83/471.3 |
| 5,524,516 | 6/1996 | Sasaki et al. | 83/471.3 |
| 5,524,518 | 6/1996 | Sundström | 83/845 |

OTHER PUBLICATIONS

"The Wide World of Scroll Saws," Wood Magazine, Oct. 1996, pp. 50–51.

*Primary Examiner*—Kenneth E. Peterson
*Attorney, Agent, or Firm*—Arnold White & Durkee

[57] ABSTRACT

Scroll saws produce an accumulation of sawdust or other debris removed from a workpiece during operation of the saw. This debris can block the operator's view of the cutting path of the saw. An improved device and method for removing accumulated debris from the cutting path of a saw blade is disclosed. A bellows is described, comprising a bellows section having an accordion-like structure and a flexible stem having a passage through which air may pass. The bellows may be manufactured as a single piece using a blow molding process to achieve greater structural integrity. A scroll saw having a bellows for removing debris and a protective cover for use with the bellows is also described.

15 Claims, 4 Drawing Sheets

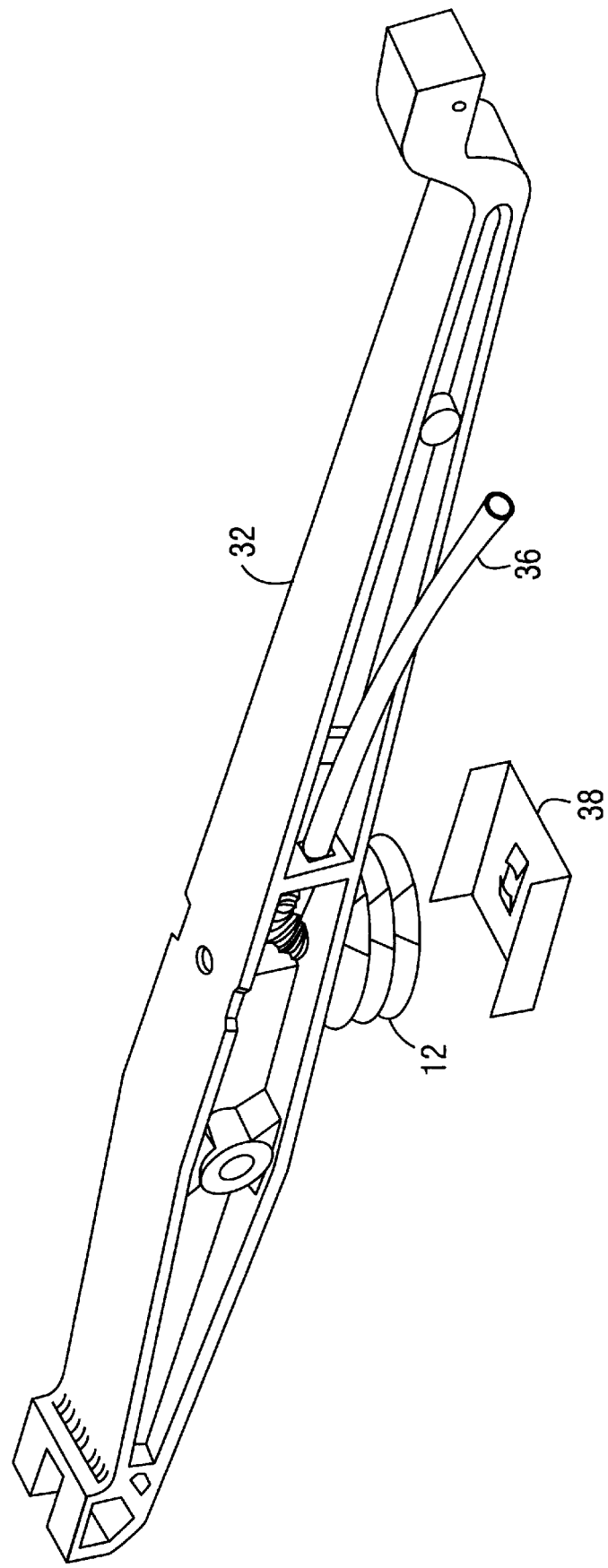

BELLOWS WITH FLEXIBLE STEM FOR SAW

BACKGROUND OF THE INVENTION

1. Field of the Invention

The present invention relates generally to bellows for removing debris from the cutting path of a saw and, more particularly, to a bellows with a flexible stem for use in a scroll saw.

2. Description of the Related Art

Scroll saws (or jig saws) typically comprise a saw blade connected between the free ends of two reciprocating arms. A frame supports the reciprocating arms and a work table positioned so that the saw blade passes through an opening in the work table. The reciprocating arms are attached to the frame by bearings that permit the arms to pivot, and a motor is linked to the reciprocating arms. In operation, the motor causes the arms to rapidly reciprocate about their pivots, causing the saw blade to move up and down rapidly. A scroll saw of this type is described in U.S. Pat. No. 5,197,369, which is hereby incorporated by reference.

During operation of the scroll saw, a workpiece is cut by placing the workpiece against the reciprocating saw blade and guiding the workpiece so that a cut of the desired shape is made. However, sawdust, metal filings, or other material removed from the workpiece by the saw blade can accumulate on the workpiece and hinder efficient operation of the scroll saw by blocking the operator's view, thereby preventing the user from accurately controlling the shape of the cut. The present invention provides an improved device and method for removing accumulated sawdust or other debris from the cutting path of a saw blade.

Bellows have been used in the past in scroll saws to blow air to remove sawdust from the cutting path of the saw blade. Bellows are suited for this application because the reciprocating movement of the scroll saw's arms can be conveniently used to repeatedly compress and release the bellows, generating the desired airflow.

Previous bellows designs have included a short, non-flexible nipple at one end of the bellows for connection to a flexible air hose that is used to direct the airflow in the desired direction. However, when such bellows are used in applications with space restrictions requiring the air hose to make a right-angle bend near to its point of attachment to the bellows, the vibration of the scroll saw tends to cause the air hose to work loose from the nipple. To solve this problem, some designs have included a separate rigid elbow-shaped tube with a right-angle bend that connects to the nipple on the bellows at one end and the air hose at the other end. This design requires the elbow to be manufactured as a separate piece from the bellows because the blow molding process typically used to make the bellows cannot be used to produce an angled nipple.

Another problem occurs when a blow molding process is used to produce the bellows from a plastic material. Although this method of manufacture is very economical, it often produces wall thickness irregularities in the article being manufactured. These irregularities occur in the area where the blow vent needle is located. Any irregularity in the wall thickness will create internal stresses in the plastic material when the area with the irregularity is flexed, leading to cracking of the wall. During operation of the bellows, the bellows section is repeatedly compressed and released, flexing the walls of the bellows section. Thus, any wall thickness irregularities in the bellows section increases the risk of premature failure of the part.

SUMMARY OF THE INVENTION

The present invention addresses the problems described above by providing a bellows with a bellows section having an accordion-like structure, and a flexible stem having a passage through which air may pass. The flexible stem permits the connection between the bellows and the air hose to be made without placing stress on the connection point. In situations requiring the air to be directed at right-angles to the axis of the bellows, the flexible stem can be made to bend and the air hose made to follow a straight path. As a result, the connection between the nipple at the end of the flexible stem and the air hose is subject to less stress and is less likely to become disconnected during operation. Corrugations in the flexible stem permit the stem to bend without collapsing and restricting the flow of air through the stem.

In accordance with another aspect of the invention, a bellows is provided having a bellows section and a flexible stem manufactured as a single piece. The one piece construction permits the blow vent needle to be located at the nipple end of the flexible stem, away from the bellows section. Any wall thickness irregularities around the blow vent needle will thus be located at the nipple end of the flexible stem, where the stresses on the wall are at a minimum.

A scroll saw having a bellows for removing debris from the cutting path of the saw constitutes another aspect of the invention, where the bellows comprises a bellows section having an accordion-like structure, and a flexible stem having a passage through which air may pass. A method of removing debris from the cutting path of a saw is a further aspect of the invention. The method comprises providing a bellows comprising a bellows section and a flexible stem, compressing the bellows section of the bellows, and directing the air expelled by the bellows onto the cutting path of the saw.

BRIEF DESCRIPTION OF THE DRAWINGS

The features and advantages of the present invention will be best appreciated upon reference to the following detailed description and the accompanying drawings, in which:

FIG. 5 is a perspective view of a scroll saw arm showing the arrangement of a bellows and protective cover.

Figure 1:
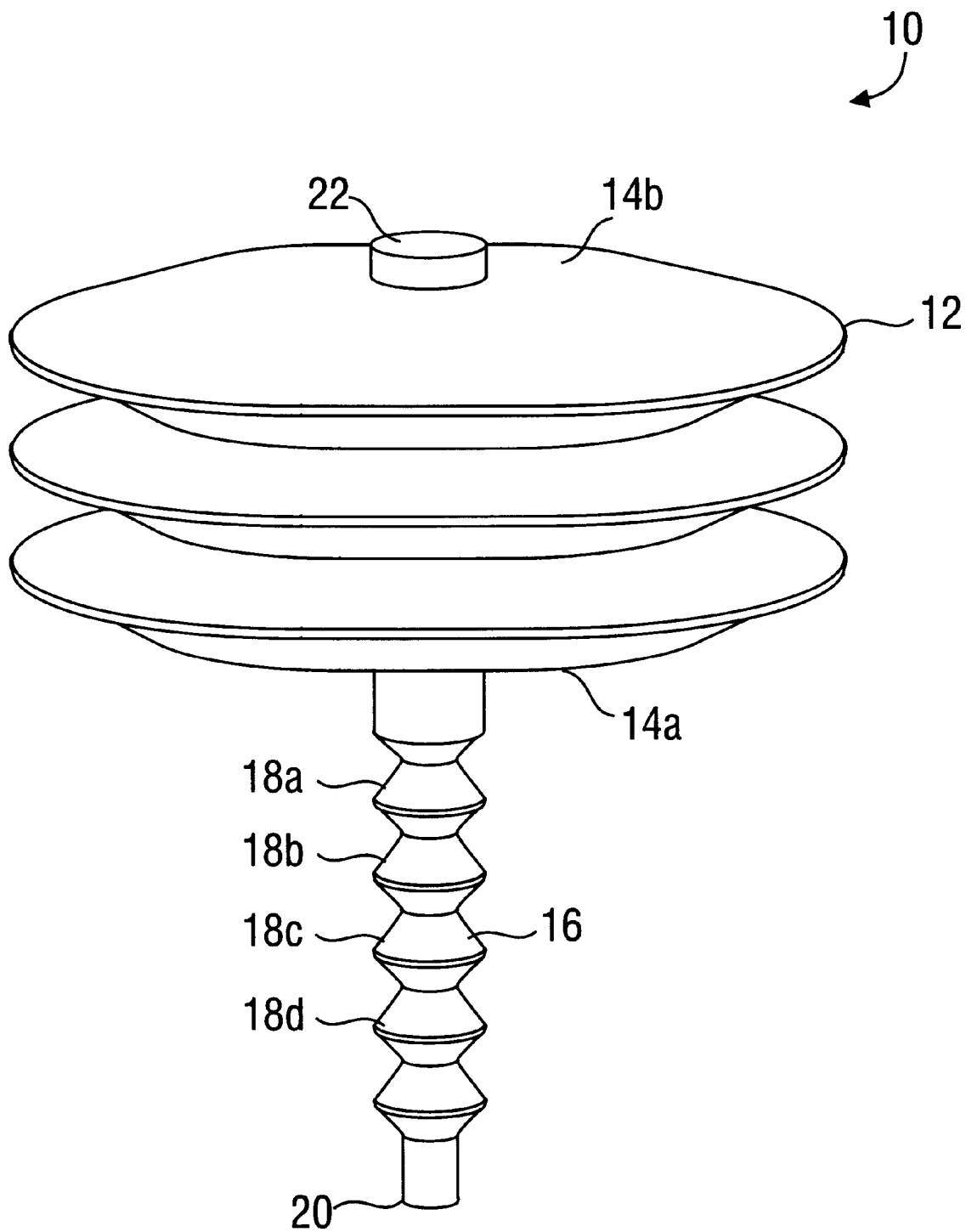
FIG. 1 is a perspective view of a preferred embodiment of the invention.

While the invention is susceptible to various modifications and alternative forms, specific embodiments have been shown by way of example in the drawings and will be described in detail herein. However, it should be understood that the invention is not intended to be limited to the particular forms disclosed. Rather, the invention is to cover all modifications, equivalents and alternatives falling within the spirit and scope of the invention as defined by the appended claims.

DESCRIPTION OF ILLUSTRATIVE EMBODIMENTS

1. PHYSICAL CONSTRUCTION

Turning now to the drawings and referring initially to FIG. 1, a perspective view is given showing a preferred embodiment of a one-piece bellows 10. A bellows section 12 comprises two surfaces, a first surface 14a and a second surface 14b, connected by an accordion-like structure. The bellows section 12 is capable of contraction and expansion as the first surface 14a and second surface 14b are pressed together or allowed to move apart. The bellows section 12 is elongated with rounded ends, although a circular, square, rectangular or other shape may be used as the particular application requires.

A flexible stem 16 extends from the first surface 14a of the bellows section 12. The flexible stem 16 has several corrugations 18a, 18b, 18c and 18d, formed by alternately increasing and decreasing the diameter of the flexible stem 16 along its length, as shown in FIG. 1. The corrugations permit the stem to bend without collapsing and restricting the flow of air through the stem. The flexible stem 16 has a nipple 20 at its is end to permit connection to an air hose. A hub 22 comprising a raised area protrudes from the second surface 14b of the bellows section 12, opposite to the flexible stem 16. The hub 22 provides a convenient means to secure a protective cover to the bellows.

Figure 2:
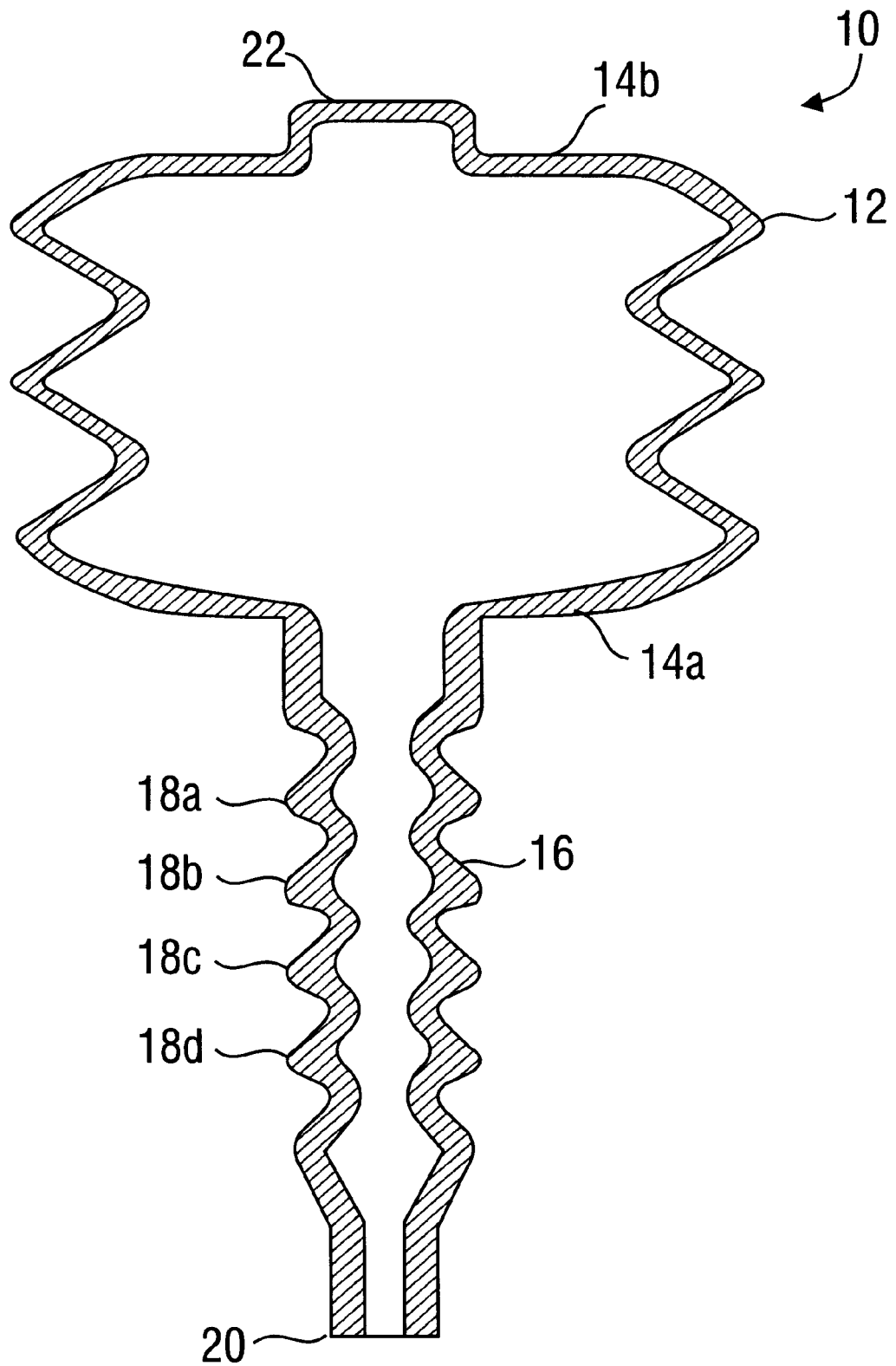
FIG. 2 is a cross-sectional view of the embodiment of FIG. 1.

FIG. 2 shows a cross-sectional view of the embodiment shown in FIG. 1. The bellows section 12 creates an enclosure having a variable volume, and the flexible stem 16 has an internal passage through which air is drawn into and expelled from the bellows section 12. The walls of the bellows section 12 are essentially of uniform thickness. Although the bellows is illustrated with the flexible stem facing downwards, the bellows may be effectively used in any orientation.

Figure 3:
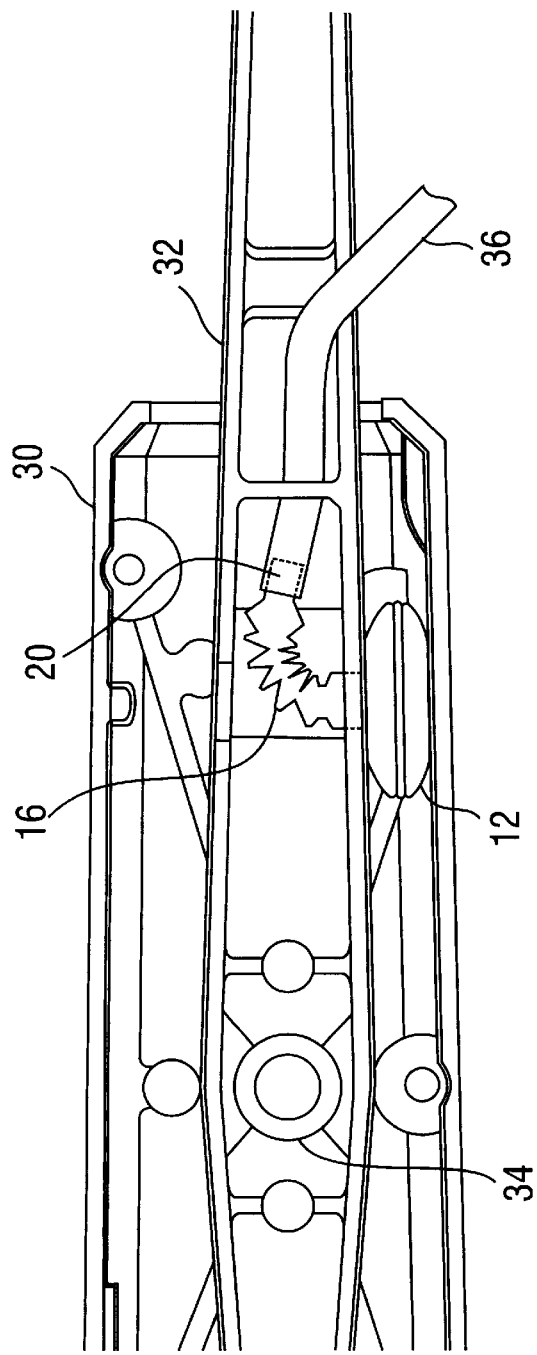
FIG. 3 shows a cross-sectional view of a portion of a scroll saw showing an embodiment of the invention installed in the scroll saw.

FIG. 3 shows a cross-sectional view of a portion of a scroll saw showing an embodiment of the invention installed in the scroll saw. A frame member 30 provides support for a reciprocating arm 32. Only a portion of the upper section of the frame and the upper reciprocating arm are shown in the drawing. The upper reciprocating arm 32 pivots about bearing 34, causing the saw blade (not shown) to move up and down. The bellows is positioned between the stationary frame member 30 and the upper reciprocating arm 32 so that the bellows section 12 of the bellows is alternately compressed and released as the reciprocating arm 32 pivots about bearing 34. The flexible stem 16 extends through a portion of the reciprocating arm 32, keeping the bellows in place. An air hose 36 connects to the nipple 20 of the bellows. The air hose 36 is routed through the reciprocating arm 32 and its open end is positioned to direct the air expelled from the bellows onto the cutting path of the saw.

Figure 4:
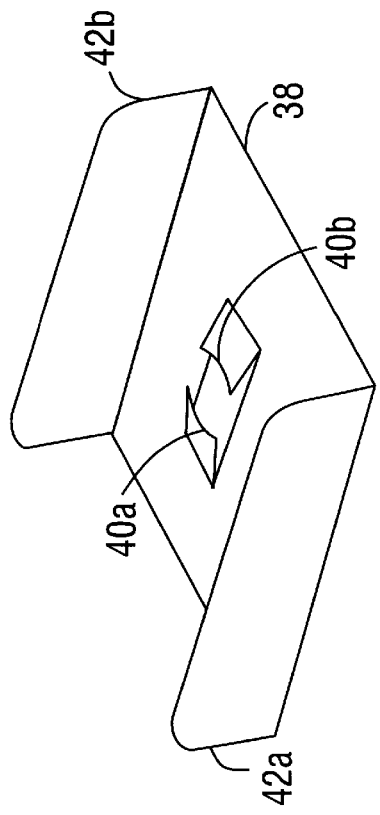
FIG. 4 is a perspective view of a preferred embodiment of a bellows protective cover.

FIG. 4 shows a preferred embodiment of a bellows protective cover. A separate rigid bellows protective cover 38 may be used to protect the bellows from physical damage that may result from rubbing or pressing on sharp areas of the reciprocating arm or scroll saw frame. A preferred embodiment of the bellows cover 38 includes fingers 40a and 40b shaped to engage the hub protruding from the bellows section. Sides 42a and 42b provide additional protection for the bellows.

FIG. 5 shows a scroll saw arm with a bellows and a protective cover. The protective cover 38 fits over the bellows section 12 as shown in the drawing.

2. THE MANUFACTURING PROCESS

The bellows may be conveniently and economically manufactured from a thermoplastic material using an extrusion blow molding process. A preferred material is low density polyethylene, although other materials may also be suitable. In the extrusion blow molding process, a heat-softened thermoplastic tube is extruded in the approximate shape of the article being manufactured. One end of the tube is pinched to close the end and the other end is sealed around a blow vent needle (or blow pin), producing a partially inflated balloon of thermoplastic material. The two halves of a female mold are closed around the balloon of material and air is blown through the blow vent needle, forcing the balloon to expand and take the shape of the internal cavity of the mold. The blow vent needle is then removed and the mold opened, ejecting the part. When the blow vent needle is removed from the mold, plastic material often adheres to the blow vent needle resulting in a thick walled section in the article being blow molded at the point where the blow vent needle is located.

In the manufacture of the bellows, the blow vent needle used in the blow molding process is preferably located at the nipple 20 on the end of the flexible stem 16. This location is chosen because any irregularities in the wall thickness of the blow molded bellows that are caused by the removal of the blow vent needle will be at a point away from the bellows section 12 of the bellows. Wall thickness irregularities in the bellows section will often lead to premature failure of the bellows, due to the repeated flexing of the bellows section walls during operation of the bellows. Any such irregularities at the nipple 20 of the flexible stem 16 will not cause this problem.

After removing the bellows from the mold, excess plastic material is removed the outer surface of the bellows. A small hole is drilled along the center of the flexible stem 16 to remove any irregularities from the inside of the flexible stem and ensure that an open air passage exists from the bellows section 12 through the flexible stem 16 to the nipple 20.

The protective cover 38 may be made from a thin plastic sheet formed by a stamping process. The sides 42 may be formed by bending portions of the sheet at right angles to the base. Fingers 40 may be formed by cutting a circular hole in the base, and making cuts in the base to define two fingers of material, one on each side of the hole. These fingers are bent upwards at about 45 degrees to the base, forming fingers that engage the hub 22 on the bellows section 12. The bellows protective cover is preferably made from mylar or a similar material.

Although the bellows and protective cover may be made using the materials and techniques described above, many other materials and methods of manufacture may also be used to make these parts.

3. OPERATION OF THE BELLOWS

In operation, the bellows section 12 of the bellows is alternatively compressed and released. When the bellows section 12 is compressed it collapses, forcing air out of the bellows section 12 and through the flexible stem 16. The air hose 36 connected to the end of the flexible stem 16 directs the air onto the cutting path of the saw blade to remove debris. When released, the bellows section 12 expands to assume its original shape, drawing air back into the bellows section 12 through the flexible stem 16. The open end of the air hose 36 is located close to the cutting path of the saw blade to provide optimal debris removal (i.e. maximum air force) on the downstroke of the reciprocating arm 32, but not so close as to draw debris into the air hose on the upstroke of the reciprocating arm 32.

Many modifications and variations may be made in the techniques and structures described and illustrated herein without departing from the spirit and scope of the present invention. Accordingly, it should be understood that the methods and apparatus described herein are illustrative only and are not limiting upon the scope of the present invention.

What is claimed is:

1. A device for removing debris from the cutting path of a saw, which comprises:
   a) a bellows section defining a first surface and a second surface opposite the first surface;
   b) a flexible stem having a passage through which air may pass, the stem being integrally formed with the bellows section and extending from the first surface, the stem defining a nipple adapted to connect to a hose;
   c) a hub comprising a raised portion extending from the second surface; and
   d) a rigid protective cover including a floor and at least two sides extending from the floor generally perpendicular thereto, the floor defining at least two fingers, the bellows situated within the protective cover such that the fingers engage the hub and the sides enclose the bellows.

2. A device as defined in claim 1 wherein the flexible stem has one or more corrugations.

3. A device as defined in claim 1 wherein the device comprises a plastic material.

4. A device as defined in claim 1 wherein the device comprises low density polyethylene.

5. A device as defined in claim 1 wherein the bellows section and the flexible stem are formed by a blow molding process.

6. A scroll saw including a blade connected to at least one reciprocating arm, at least a portion of the arm extending from an end of a frame member, the frame member housing a bearing about which the arm pivots, the scroll saw further having a device for removing debris from the cutting path of the saw, comprising:
   a) a bellows defining a first surface and a second surface opposite the first surface;
   b) a flexible stem having a passage through which air may pass, the stem being integrally formed with the bellows section and extending from the first surface, the stem defining a nipple
   c) a hub comprising a raised portion extending from the second surface;
   d) a rigid protective cover including a floor and at least two sides extending from the floor generally perpendicular thereto, the floor defining at least two fingers, the bellows situated within the protective cover such that the fingers engage the hub and the sides enclose the bellows, the protective cover being positioned within the frame member between the bearing and the end from which the arm extends such that the arm alternately compresses and releases the bellows as the arm pivots about the bearing; and
   e) a hose having first and second ends, the first end connected to the nipple, the second end extending through the arm and positioned to direct air expelled from the bellows onto the cutting path of the saw.

7. A scroll saw as defined in claim 6 wherein the bellows comprises a plastic material.

8. A scroll saw as defined in claim 6 wherein the bellows comprises low density polyethylene.

9. A scroll saw as defined in claim 6 wherein the device is produced by a blow molding process.

10. A scroll saw as defined in claim 6 wherein the flexible stem of the bellows has one or more corrugations.

11. A device for removing debris from the cutting path of a saw, which comprises:
    a) a bellows section having a first surface, a second surface, and an accordion structure connecting the first and second surfaces;
    b) a flexible stem having one or more corrugations through which air may pass, the stem being integrally connected to the first surface of the bellows section, the stem defining a nipple adapted to connect to a hose;
    c) a hub comprising a raised portion extending from the second surface; and
    d) a rigid protective cover including a floor and at least two sides extending from the floor generally perpendicular thereto, the floor defining at least two fingers, the bellows situated within the protective cover such that the fingers engage the hub and the sides enclose the bellows.

12. A device as defined in claim 9 wherein the device comprises low density polyethylene.

13. A device as defined in claim 9 wherein the device is produced by a blow molding process.

14. A device as defined in claim 9 wherein the device comprises a plastic material.

15. A device as defined in claim 1 which further comprises an air hose having one end connected to the nipple.

* * * * *